United States Patent
Han et al.

(10) Patent No.: US 12,111,225 B2
(45) Date of Patent: Oct. 8, 2024

(54) ACCELERATED LIFE TEST METHOD FOR SPEED REDUCER OF INDUSTRIAL ROBOT

(71) Applicant: Hebei University of Technology, Tianjin (CN)

(72) Inventors: Xu Han, Tianjin (CN); Shuyong Duan, Tianjin (CN); Xin Gao, Tianjin (CN); Yourui Tao, Tianjin (CN); Nan Ye, Tianjin (CN); Jia Wang, Tianjin (CN)

(73) Assignee: Hebei University of Technology, Tianjin (CN)

( * ) Notice: Subject to any disclaimer, the term of this patent is extended or adjusted under 35 U.S.C. 154(b) by 314 days.

(21) Appl. No.: 17/868,399

(22) Filed: Jul. 19, 2022

(65) Prior Publication Data

US 2023/0168148 A1     Jun. 1, 2023

(30) Foreign Application Priority Data

Nov. 29, 2021   (CN) .......................... 202111428249.9

(51) Int. Cl.
*G01M 13/021* (2019.01)
*B25J 9/10* (2006.01)
*B25J 19/00* (2006.01)

(52) U.S. Cl.
CPC ......... *G01M 13/021* (2013.01); *B25J 9/1025* (2013.01); *B25J 19/0095* (2013.01)

(58) Field of Classification Search
CPC .. G01M 13/021; G01M 13/025; G01M 13/02; G01M 13/028; G01M 13/026; G01M 13/023; G01M 13/00; G01M 13/04; G01M 13/027; G01M 13/022; G01M 7/00; G01M 13/045; G01M 15/044; G01M 17/007; G01M 17/0072; G01M 17/022; G01M 7/045; G01M 7/08; G01M 1/04; G01M 13/003; G01M 15/00; G01M 15/02; G01M 17/0074; G01M 17/04; G01M 17/06; G01M 3/2846; G01M 5/0033; G01M 7/025; G01M 7/04; G01M 99/002; B23F 23/1218; B23F 19/025; B23F 23/12; B23F 19/02; B23F 19/04; B23F 17/001; B23F 19/055;
(Continued)

(56) References Cited

U.S. PATENT DOCUMENTS

2013/0151214 A1*  6/2013  Ryou ................. G05B 19/4065
                                                           703/2

FOREIGN PATENT DOCUMENTS

CN      109902334 A  *  6/2019
CN      111623105 A  *  9/2020  ............. F16H 57/01
(Continued)

*Primary Examiner* — Andre J Allen
(74) *Attorney, Agent, or Firm* — Maine Cernota & Curran

(57) ABSTRACT

An accelerated life test method for a speed reducer of an industrial robot is provided. The accelerated life test method includes: setting first load stress higher than rated load stress and second load stress lower than the rated load stress; performing an accelerated life test by loading the first load stress to first speed reducer samples; calculating a service life of each of the first speed samples in the accelerated life test; performing a contrast test by loading the second load stress to second speed reducer samples; calculating a service life of each of the second speed samples in the contrast test; and calculating an acceleration coefficient, and the acceleration coefficient is equal to a ratio of the service life in the accelerated life test to the service life in the contrast test.

14 Claims, 6 Drawing Sheets

(58) Field of Classification Search
CPC ...... B23F 23/04; B23F 23/06; B23F 23/1281;
B23F 19/00; B23F 23/00; B23F 23/02;
B23F 23/10; B23F 17/006; B23F 19/05;
B23F 23/006; B23F 23/08; B23F 23/085;
B23F 23/1293; B23F 1/06; B23F 17/00;
B23F 19/002; B23F 9/025; B23F 9/10
USPC .......................................................... 73/162
See application file for complete search history.

(56) References Cited

FOREIGN PATENT DOCUMENTS

| | | | | |
|---|---|---|---|---|
| CN | 114757033 A | * | 7/2022 | |
| CN | 108287072 B | * | 8/2023 | ............. G01D 21/02 |
| CN | 117168802 A | * | 12/2023 | |
| CN | 117848707 A | * | 4/2024 | |
| CN | 118057140 A | * | 5/2024 | |
| JP | 7485930 B2 | * | 5/2024 | |

\* cited by examiner

ACCELERATED LIFE TEST METHOD FOR SPEED REDUCER OF INDUSTRIAL ROBOT

RELATED APPLICATIONS

This application claims the priority of Chinese Application No. CN202111428249.9, filed Nov. 29, 2021, which is herein incorporated by reference in its entirety for all purposes.

FIELD OF THE INVENTION

The present disclosure is specifically an accelerated life test method for a speed reducer of an industrial robot.

BACKGROUND OF THE INVENTION

With the advent of automation and intelligence, the industrial robot has become an indispensable part in manufacturing industry. Moreover, the performance of the speed reducer, which is as an important part of robot joint, plays a vital role in the robot.

The RV (Rotational Vector) speed reducer and the harmonic speed reducer have many advantages, such as large transmission ratio, small transmission mechanism volume, high load capacity, high strength and stiffness, long service life, high movement accuracy and small rotation error. The RV speed reducer and the harmonic speed reducer are the most commonly used speed reducers for industrial robots, and are also one of the key factors affecting the reliability of the industrial robots. However, the life of the speed reducer for an industrial robot is long and the performance degradation is slow. So, it is difficult to obtain the lifespan of the speed reducer for an industrial robot at present. Accordingly, it requires long time and high economic cost to perform the life test of the speed reducer for an industrial robot under normal stress. At present, there is not a reliable prediction method and a reliable prediction system for the life of the speed reducer for an industrial robot, and this situation needs to be improved.

What is needed, therefore, is a reliable prediction method and a reliable prediction system for the life of the speed reducer for an industrial robot.

SUMMARY OF THE INVENTION

The present disclosure aims to at least solve one of the technical problems in the prior art. To this end, the present disclosure provides an accelerated life test method for a speed reducer of an industrial robot.

The accelerated life test method for a speed reducer of an industrial robot includes the steps of setting a first load stress higher than a rated load stress, and a second load stress lower than the rated load stress; performing an accelerated life test by loading the first load stress to first speed reducer samples; calculating a service life of each of the first speed samples in the accelerated life test; performing a contrast test by loading the second load stress to second speed reducer samples; calculating a service life of each of the second speed samples in the contrast test; calculating an acceleration coefficient, the acceleration coefficient is equal to a ratio of the service life in the accelerated life test to the service life in the contrast test; estimating a lifetime of the speed reducer according to the acceleration coefficient; and servicing or replacing the speed reducer before it has reached its estimated lifetime.

In some embodiments, the accelerated life test further includes: switching the first speed reducer samples to operate in a first direction for a preset time interval and then unloading the first load stress; and switching the first speed reducer samples to operate in a second direction for a preset time interval and then unloading the first load stress.

In some embodiments, the accelerated life test further includes: switching the first speed reducer samples to operate in the first direction for a first preset time interval and then loading a stress of each of the first speed reducer samples to the first load stress or the second load stress; enabling the first speed reducer samples to operate for a second preset time interval at the first load stress or the second load stress and then unloading the first load stress or the second load stress; switching the first speed reducer samples to operate in the second direction for the first preset time interval and then loading the stress of each of the first speed reducer samples to the first load stress or the second load stress; enabling the first speed reducer samples to operate for the second preset time interval at the first load stress or the second load stress and then unloading the first load stress or the second load stress.

In some embodiments, the accelerated life test further includes: enabling the first speed reducer samples to operate for the second preset time interval at the first load stress or the second load stress and then unloading the first load stress or the second load stress; and after unloading the first load stress or the second load stress for a third preset time interval, switching the first speed reducer samples to operate in the first direction or the second direction.

In some embodiments, the accelerated life test further includes: for each of the first speed reducer samples, driving an output end of the first speed reducer sample to rotate to a first preset angle in a fourth preset time interval, and enabling the first speed reducer sample to remain at the first preset angle for a fifth preset time interval; driving the output end of the first speed reducer sample to rotate to a second preset angle in the fourth preset time interval, and enabling the first speed reducer sample to remain at the second preset angle for the fifth preset time interval; driving the output end of the first speed reducer sample to rotate back to the first preset angle in the fourth preset time interval, and enabling the first speed reducer sample to remain at the first preset angle for the fifth preset time interval; and driving the output end of the first speed reducer sample to rotate to an initial position.

In some embodiments, the accelerated life test further includes: setting a temperature stress of each of the first speed reducer samples, where a working temperature of the first speed reducer sample under the temperature stress is higher than a rated working temperature of the first speed reducer sample; and using the temperature stress as an accelerated stress in the accelerated life test.

In some embodiments, the accelerated life test further includes: setting the working temperature of each of the first speed reducer samples under the temperature stress to include a first temperature, a second temperature and a third temperature which are gradually increased; and gradually increasing the working temperature of the first speed reducer sample to the first temperature, to the second temperature and to the third temperature in a sixth-time-interval-spaced manner.

In some embodiments, the accelerated life test and the contrast test further include: testing performance indexes of each of the first speed reducer samples and the second speed reducer samples in a preset-time-spaced manner; and stopping the accelerated life test and the contrast test in response to the first speed reducer samples and second speed reducer samples being failure.

In conclusion, the present disclosure provides an accelerated life test method for a speed reducer of an industrial robot. According to the method, in combination with actual working conditions of the industrial robot, the first load stress higher than the rated load stress is set to use as the accelerated stress of the accelerated life test for the speed reducer, so that the life test time is reduced. Accordingly, the second load stress lower than the rated load stress is set, and the contrast test is performed by loading the second load stress to second speed reducer samples. And the acceleration coefficient can be calculated by calculating the service life of each of the first speed samples in the accelerated life test and the service life of each of the second speed samples in the contrast test respectively. Compared with the prior art, the performance of the speed reducer, which is as a core part of the industrial robot, directly affects the performance of the industrial robot. However, the life of the speed reducer for an industrial robot is long, and the performance degradation is slow. Therefore, it is difficult to obtain the lifespan of the speed reducer for an industrial robot at present. Also, it requires long time and high economic cost to perform the life test of the speed reducer for an industrial robot under normal stress. The method has the advantages as follows. On one hand, the first load stress higher than the rated load stress is used as acceleration stress to load to the first speed reducer samples to perform the accelerated life test, so that the life test time thereof can be shortened. On the other hand, the second load stress lower than the rated load stress is loaded to the second speed reducer samples for performing the contrast test, and the service life in the accelerated life test and the service life in the contrast test are respectively calculated to obtain the acceleration coefficient.

In some embodiments, the method further includes other steps of the accelerated life test, for example, switching the first speed reducer samples to operate in the first direction for the preset time interval and then unloading the first load stress; and switching the first speed reducer samples to operate in the second direction for the preset time interval and then unloading the first load stress. Based on this design, in the accelerated life test, while the first load stress is loading, each speed reducer is switched to operate in the first direction for the preset time interval, and then the first load stress is unloaded. Then, each speed reducer is switched to operate in the second direction for the preset time interval and the first load stress is unloaded. Based on the design, compared with the above technical solution, a preferable acceleration effect is achieved for the life test of the speed reducers by controlling two factors, namely the operating direction and the load of each speed reducer.

In some embodiments, the method further specifically includes other steps of the accelerated life test, for example, switching the first speed reducer samples to operate in the first direction for a first preset time interval and then loading a stress of each of the first speed reducer samples to the first load stress; enabling the first speed reducer samples to operate for a second preset time interval at the first load stress and then unloading the first load stress; switching the first speed reducer samples to operate in the second direction for the first preset time interval and then loading the stress of each of the first speed reducer samples to the first load stress; enabling the first speed reducer samples to operate for the second preset time interval at the first load stress and then unloading the first load stress. Based on the design, in the accelerated life test, while the first load stress is loading, each speed reducer is switched to operate in the first direction for the first preset time interval and then the stress thereof is loaded to the first load stress; each speed reducer operates for the second preset time interval at the first load stress and then the first load stress thereof is unloaded; each speed reducer is switched operate in the second direction for the first preset time interval and then the stress thereof is loaded to the first load stress; and the first speed reducer sample operates for the second preset time interval at the first load stress and then the first load stress thereof is unloaded. Based on the above design, in the accelerated life test, the above loading process is performed as follows: the stress of each speed reducer is firstly loading in a forward direction (namely, the first direction) to the first load stress and operates under the first load stress for the second preset time interval, then the first load stress of the first speed reducer sample is unloaded. And, the stress of each speed reducer is loaded in a backward direction (namely, the second direction) for a time interval which is the same as the loading time in the forward direction. Preferably, in the accelerated life test, after the stress of the first speed reducer sample is unloaded for the third preset time interval, the first speed reducer sample is switched to operate in the first direction or the second direction. Based on this design, the acceleration process is smoother.

In some embodiments, the method further specifically includes other steps of the accelerated life test, such as driving the output end of the first speed reducer sample to rotate to the first preset angle in the fourth preset time interval, and enabling the first speed reducer sample to remain at the first preset angle for the fifth preset time interval; driving the output end of the first speed reducer sample to rotate to the second preset angle in the fourth preset time interval, and enabling the first speed reducer sample to remain at the second preset angle for the fifth preset time interval; driving the output end of the first speed reducer sample to rotate back to the first preset angle in a fourth preset time interval, and enabling the first speed reducer sample to remain at the first preset angle for the fifth preset time interval; and driving the output end of the first speed reducer sample to rotate to an initial position. Compared with the prior art, under the action of the first load stress, the actual use process of the industrial robot is simulated, thus the life test time of the speed reducer for an industrial robot is reduced, and the actual working conditions of the speed reducer are also fitted.

In some embodiments, the method further specifically includes other steps of the accelerated life test, for example, setting a temperature stress of each of the first speed reducer samples, where a working temperature of the first speed reducer sample under the temperature stress is higher than a rated working temperature of the first speed reducer sample; and using the temperature stress as the accelerated stress of the accelerated life test. The working temperature of the industrial robot is 5° C. to 55° C., and the working temperature that the speed reducer can withstand in the working process is much higher than the working temperature of industrial robot. The maximum temperature that the speed reducer can withstand is selected as a temperature of the speed reducer at which this speed reducer bears the temperature stress, without changing the failure mechanism of the speed reducer. Namely, without changing the lubricating grease lubrication state of the speed reducer, the time of the accelerated life test can be shortened by combining the first load stress.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

Other features, objects and advantages of the present disclosure will become more apparent by reading the detailed description of non-restrictive embodiments, which is made with reference to the following accompanying drawings.

DETAILED DESCRIPTION

The present disclosure is further described in conjunction with the accompanying drawings and embodiments. It is understandable that the specific embodiments described herein are illustrative only and are not restrictive of the present disclosure. Moreover, it is noted that, for ease of description, only parts that are relevant to the present disclosure are shown in the attached figures.

It needs to be illustrated that under the compatible condition, the embodiments in the present disclosure and the features in the embodiments can be combined with each other. The present disclosure will be described in detail below with reference to the accompanying drawings in conjunction with the embodiments.

Embodiment I

Figure 10:
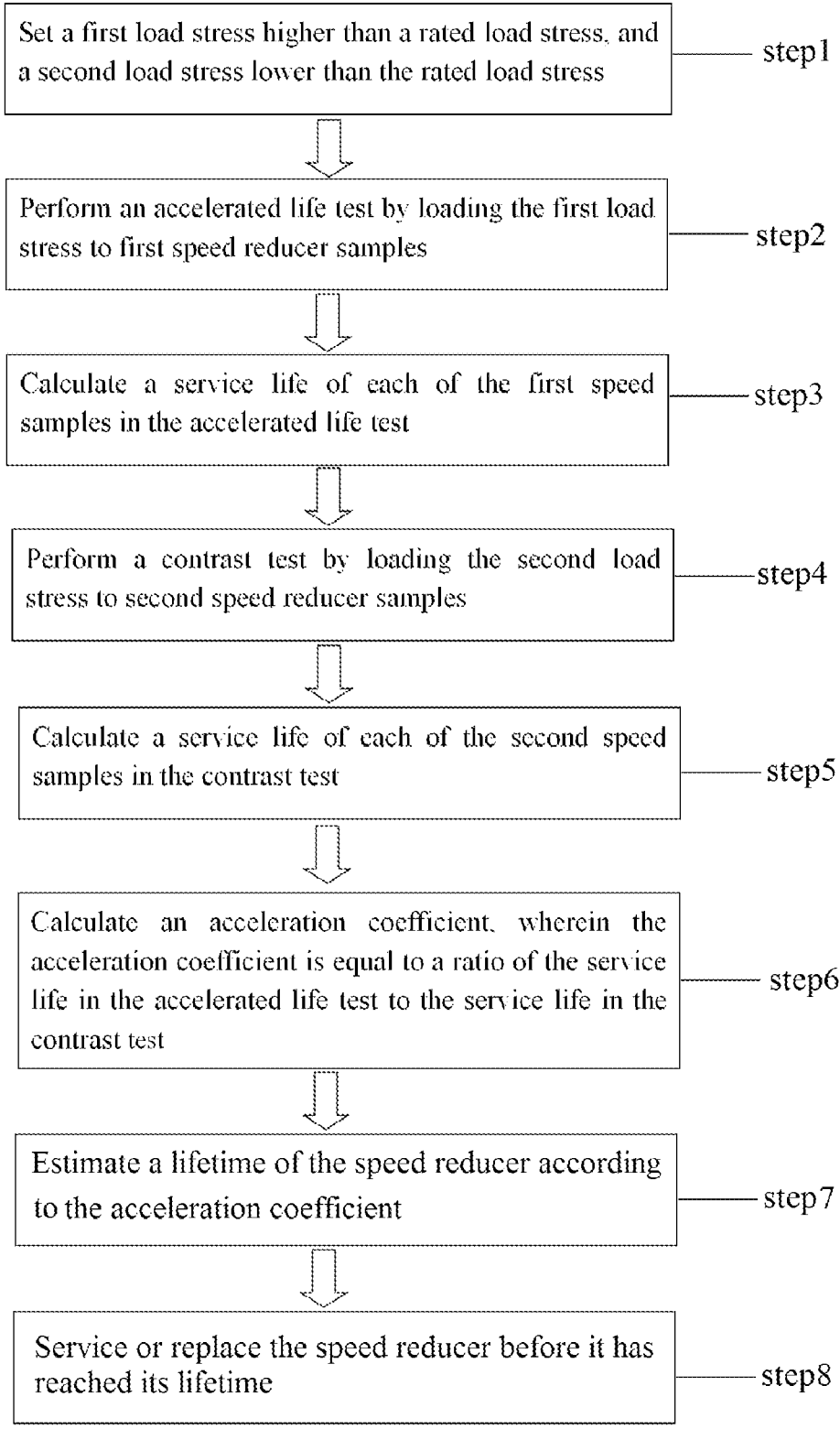
FIG. 10 is a schematic flow diagram of an accelerated life test method according to an embodiment of the present disclosure.

With reference to FIG. 10, accelerated life test method for a speed reducer of an industrial robot includes the following steps. In step 1, a first load stress higher than rated load stress and a second load stress lower than the rated load stress are set; in step 2, an accelerated life test is performed by loading the first load stress to first speed reducer samples; in step 3, a service life of each of the first speed samples in the accelerated life test is calculated; in step 4, a contrast test is performed by loading the second load stress to second speed reducer samples; in step 5, a service life of each of the second speed samples in the contrast test is calculated; in step 6, an acceleration coefficient is calculated which is equal to a ratio of the service life of the accelerated life test to the service life of the contrast test; in step 7, a lifetime of the speed reducer is estimated according to the acceleration coefficient; and in step 8, the speed reducer is serviced or replaced before it has reached its estimated lifetime.

When the first load stress, namely the torque, is used as the acceleration stress, a good acceleration effect is achieved, and the failure mechanism of the speed reducer cannot be changed. Therefore, it is necessary to strictly specify the maximum loading value of the load of the speed reducer.

The industrial robot can be started and stopped frequently in the actual using process The instantaneous starting and stopping torques of the speed reducer are great in the starting and stopping process. In consideration of the actual using conditions, in the embodiment, preferably, the set first load stress should be not more than 2.5 times the rated load, so that a good acceleration effect is achieved without changing the failure mechanism of the speed reducer.

Figure 1:
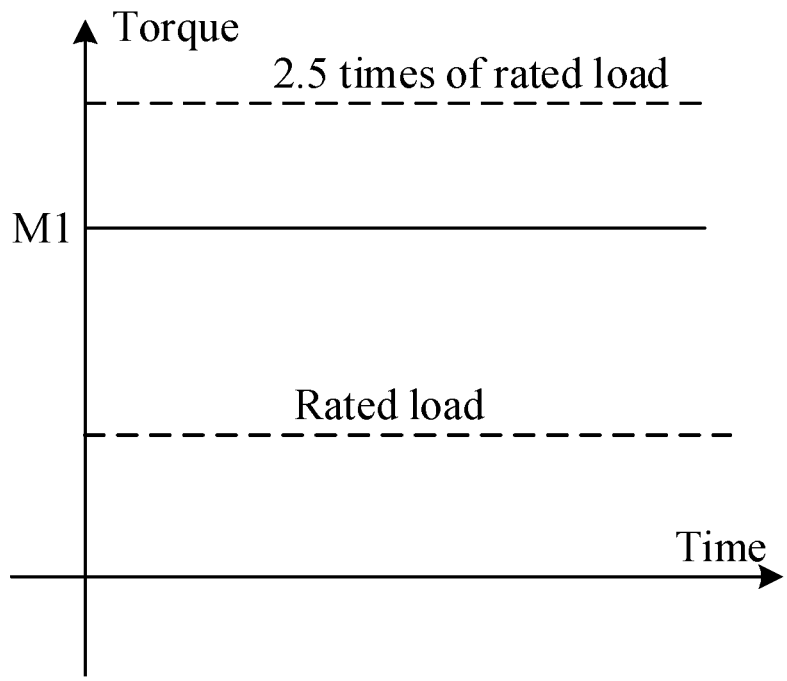
FIG. 1 is a schematic diagram of a process of a first accelerated life test according to an embodiment of the present disclosure.

Referring to FIG. 1, in order to illustrate that the acceleration stress of the speed reducer is between the rated load and the load of 2.5 times the rated load in the acceleration process, the ascending and descending processes are omitted. In the embodiment, the accelerated life test includes the following specific steps. The first load stress higher than the rated load stress is set, and the numerical value of the first load stress should be between the rated load stress and the stress of 2.5 times of the rated load stress. And, the first load stress higher than the rated load stress as shown in FIG. 1 is M1.

The accelerated life test is performed by loading the first load stress to the speed reducer samples; the accelerated life test is performed under the first load stress level, and the recorded performance indexes of the speed reducer includes, but not limited to, transmission accuracy time-varying rule, rigid time-varying rule, transmission efficiency time-varying rule, until the test is finished.

The service life in the accelerated life test is calculated.

Figure 2:
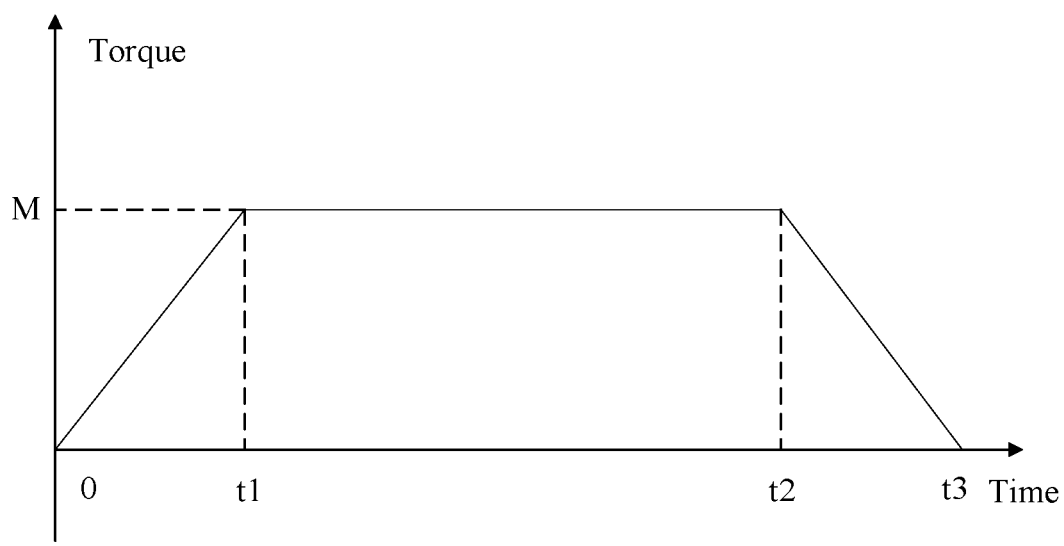
FIG. 2 is a schematic diagram of a process of a contrast test according to an embodiment of the present disclosure.

Referring to FIG. 2, in the embodiment, the contrast test includes the following specific steps. The second load stress lower than the rated load stress is set. M in FIG. 2 is the second load stress, and the second load stress is lower than the rated load stress.

The contrast test is performed by loading the second load stress to the speed reducer samples. The contrast test is performed under the second load stress level, and the recorded performance indexes of the speed reducer includes, but not limited to, transmission accuracy time-varying rule, rigid time-varying rule, transmission efficiency time-varying rule, until the test is finished.

The service life in the contrast test is calculated.

The acceleration coefficient is calculated based on the service life in the accelerated life test and the service life in the contrast test that are obtained by calculation, and the acceleration coefficient is equal to a ratio of the service life in the accelerated life test to the service life in the contrast test.

Compared with the prior art, the performance of the speed reducer which is as a core part of the industrial robot, directly affects the performance of the industrial robot. However, the life of the speed reducer for an industrial robot is long, and the performance degradation is slow. Therefore, it is difficult to obtain the lifespan of the speed reducer for an industrial robot at present. It requires long time and high economic cost to perform the test for the life of the speed reducer for an industrial robot under normal stress. The method has the following advantages. On one hand, the accelerated life test is performed by loading the first load stress higher than the rated load stress, which is used as acceleration stress, so that the life test time can be shortened. On the other hand, the contrast test is performed by loading the second load stress lower than the rated load stress, and the service life in the accelerated life test and the service life in the contrast test are respectively calculated to obtain the acceleration coefficient.

By setting the accelerated life test in the embodiment as a first accelerated life test, the calculated acceleration coefficient is a first acceleration coefficient which is equal to a ratio of the service life in the first accelerated life test to the service life in the contrast test.

After the first acceleration coefficient is obtained, if the service lives of the speed reducer are to be obtained, each speed reducer can be tested according to the process of the first accelerated life test. The service life in the first accelerated life test is firstly obtained, and the service life of the speed reducer can be obtained. The service life of the speed reducer is equal to a ratio of the service life in the first accelerated life test to the first acceleration coefficient.

Preferably, the specific method for calculating the service life in the accelerated life test is as follows. Performance degradation quantities of each speed reducer sample is obtained after a preset time interval in the accelerated life test, The performance indexes include transmission accuracy, stiffness and transmission efficiency. And, the performance degradation quantities include a decline value of transmission accuracy, or a decline value of stiffness or transmission efficiency (refers to recorded test data herein). Specifically, the decline value of transmission accuracy is equal to transmission accuracy at the moment of tx (x is equal to 1, 2, 3 . . . , n) minus initial transmission accuracy. The decline value of stiffness is equal to initial stiffness minus stiffness at the moment of tx (x is equal to 1, 2, 3 . . . , n). And, the decline value of transmission efficiency is equal to initial transmission efficiency minus transmission efficiency at the moment of tx (x is equal to 1, 2, 3 . . . , n). The decline values are as shown in table 1.

TABLE 1 performance degradation quantities of the speed reducer samples in the accelerated life test

| Test Time | Test Quantities Performance Degradation quantities |
| --- | --- |
| t1 | $D_{11}$ |
| t2 | $D_{21}$ |
| t3 | $D_{31}$ |
| . . . | . . . |
| tn | $D_{n1}$ |

Figure 9:
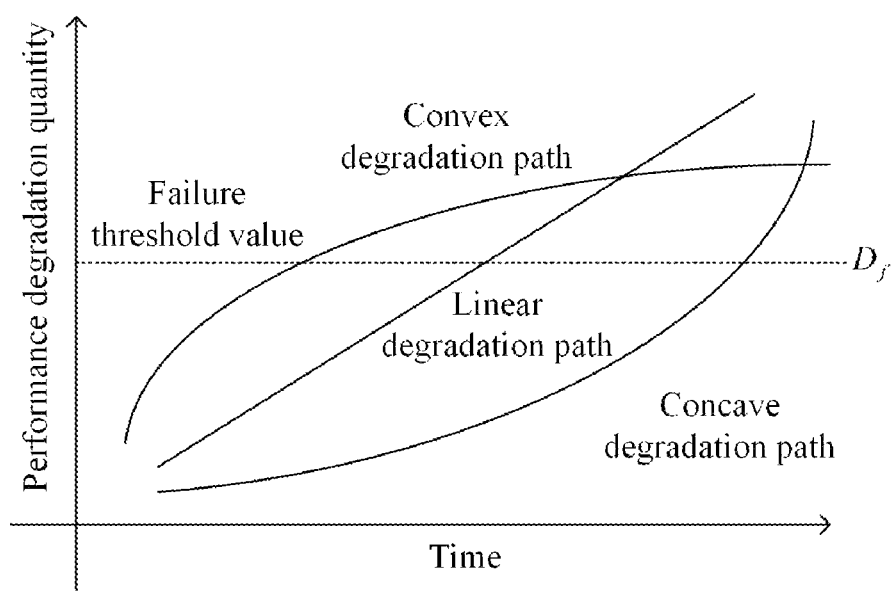
FIG. 9 is a schematic diagram of known performance degradation paths.

After the table 1 is obtained, performance degradation paths are drawn by setting time as an abscissa axis and the performance degradation quantities as ordinate axis. The three known performance degradation paths at present, as shown in FIG. 9, include a linear degradation path, a convex degradation path and a concave degradation path. $D_f$ indicates a failure threshold value. The three performance degradation paths respectively correspond to different performance degradation path models, which is specifically as shown below.

The performance degradation path model of the linear degradation path is represented by following formula.

$$D_i = \alpha_i + \beta_i t$$

Where $D_i$ indicates the performance degradation quantity, $\alpha_i$ and $\beta_i$ indicate unknown parameters of the linear degradation path model, t indicates time, and i indicates the i-th speed reducer.

The performance degradation path model of the convex degradation path is represented by following formula.

$$D_i = \alpha_i + \beta_i \ln t$$

Where $D_i$ indicates the performance degradation quantity, $\alpha_i$ and $\beta i$ indicate unknown parameters of the linear degradation path model, t indicates time, and i indicates the i-th speed reducer.

The performance degradation path model of the concave degradation path is represented by following formula.

$$D_i = \exp[\alpha_i + \beta_i t]$$

Where $D_i$ indicates the performance degradation quantity, $\alpha_i$ and $\beta_i$ indicate unknown parameters of the linear degradation path model, t indicates time, and i indicates the i-th speed reducer.

According to the performance degradation paths drawn in Table 1, it can be intuitively seen which performance degradation path matches to the performance degradation quantity in Table 1. By substituting t and $D_i$, unknown parameters in the performance degradation path can be obtained, and a performance degradation function can be obtained.

According to the obtained performance degradation function, the failure time t when the failure threshold value is $D_f$ can be obtained, so that the service life of the speed reducer sample in the accelerated life test is obtained.

In some embodiments, the method for calculating the service life in the contrast test is the same as the specific method for calculating the service life in the accelerated life test.

In some embodiments, when multiple samples are tested simultaneously in one accelerated life test, the service life in the accelerated life test is equal to a ratio of the sum of the service lives of the multiple speed reducer samples to the number of the speed reducer samples.

Similarly, when multiple samples are tested simultaneously in one contrast test, the service life in the contrast test is equal to a ratio of the sum of the service lives of the multiple speed reducer samples to the number of the speed reducer samples.

Embodiment II

An accelerated life test method for a speed reducer of an industrial robot includes the following steps. A first load stress higher than rated load stress and a second load stress lower than the rated load stress are set; an accelerated life test is performed by loading the first load stress to first speed reducer samples, the first speed reducer samples are switched to operate in a first direction for a preset time interval and then the first load stress is unloaded, and the first speed reducer samples are switched to operate in a second direction for a preset time interval and then the first load stress is unloaded; a service life of each of the first speed samples in the accelerated life test is calculated; a contrast test is performed by loading the second load stress to second speed reducer samples; a service life of the contrast test is calculated; and an acceleration coefficient of each of the second speed samples is calculated which is equal to a ratio of the service life in the accelerated life test to the service life in the contrast test.

Figure 3:
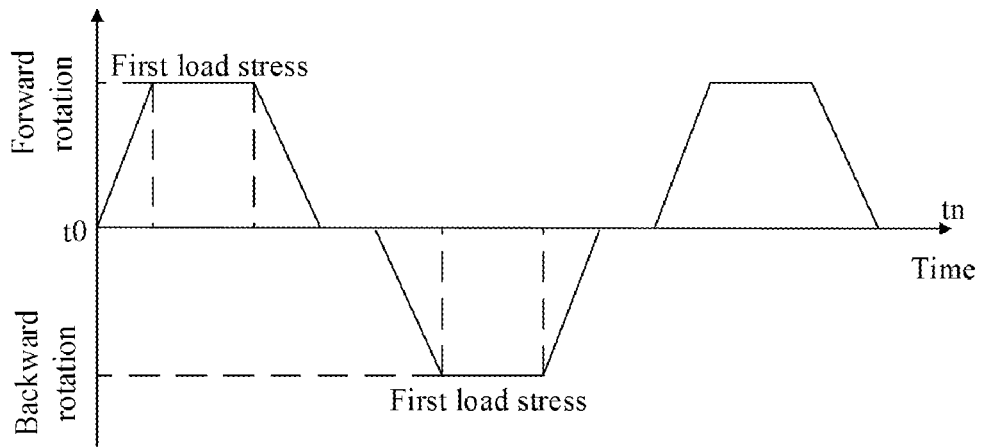
FIG. 3 is a schematic diagram of a process of a second accelerated life test according to an embodiment of the present disclosure.

Referring to FIG. 3, the accelerated life test process includes the following specific steps. The first load stress higher than the rated load stress is set. Preferably, the numerical value of the first load stress is between the rated load stress and the stress of 2.5 times the rated load stress; the accelerated life test is performed by loading the first load stress to first speed reducer samples, first speed reducer samples are switched to operate in a first direction for a preset time interval and then the first load stress is unloaded, and first speed reducer samples are switched to operate in a second direction for a preset time interval and then the first load stress is unloaded. Specifically, referring to FIG. 3, firstly, the speed reducer is loaded with the stress in the forward direction, namely, in the first direction. The speed reducer operates in the first direction for a certain time interval and then the stress of the speed reducer is loaded to the first load stress, and the first load stress of the speed reducer is unloaded after the speed reducer operates for a preset time interval at the first load stress. Then, the speed reducer is loaded with the stress in the backward direction, namely, in the second direction. The speed reducer operates in the second direction for a certain time interval and then the stress of the speed reducer is loaded to the first load stress, the first load stress of the speed reducer is unloaded after the speed reducer operates for a preset time interval at the first load stress.

The service life in the accelerated life test is calculated.

Referring to FIG. 2, the contrast test process includes the following specific steps. The second load stress lower than the rated load stress is set. The contrast test is performed by loading the second load stress until the test is finished.

The service life in the contrast test is calculated.

The acceleration coefficient is calculated, and the acceleration coefficient is equal to a ratio of the service life in the accelerated life test to the service life in the contrast test.

Based on the design, compared with the above technical scheme, it can be seen that, in the accelerated life test, by controlling two factors that are the operating direction and the load of the speed reducer, under maintaining the higher first load stress, the operating direction of the speed reducer is switched repeatedly, which may achieve the preferable acceleration effect for the life test of the speed reducer.

By setting the accelerated life test as shown in FIG. 3 in the embodiment as a second accelerated life test, the calculated acceleration coefficient is a second acceleration coefficient which is equal to a ratio of the service life in the second accelerated life test to the service life in the contrast test.

After the second acceleration coefficient is obtained, if the service lives of the speed reducers are to be obtained, each speed reducer can be tested according to the process of the second accelerated life test. The service life in the second accelerated life test is firstly obtained, and the service life of the speed reducer can be obtained. The service life of the speed reducer is equal to a ratio of the service life in the second accelerated life test to the second acceleration coefficient.

Embodiment III

Figure 4:
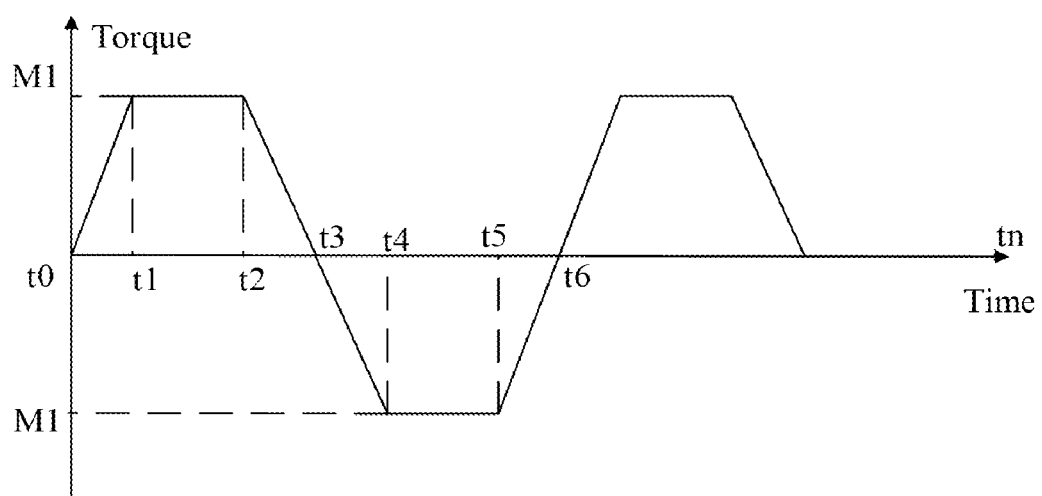
FIG. 4 is a schematic diagram of a process of a third accelerated life test according to an embodiment of the present disclosure.

The difference of this embodiment from embodiment II is that an accelerated life test method for a speed reducer of an industrial robot includes the following steps. Referring to FIG. 4, the accelerated life test process includes the following specific steps. A first load stress higher than the rated load stress is set; a accelerated life test is performed by loading the first load stress to first speed reducer samples, the first speed reducer samples are switched to operate in a first direction for a first preset time interval and then a stress of each of the first speed reducer samples is loaded to the first load stress; the first load stress is unloaded after the first speed reducer sample operates for a second preset time interval at the first load stress; the first speed reducer samples are switched to operate in the second direction for the first preset time interval and then the stress of each of the first speed reducer samples is loaded to the first load stress; the first load stress is unloaded after the first speed reducer sample operates for the second preset time interval at the first load stress. A service life of the accelerated life test is calculated.

In FIG. 4, the torque value of M1 is the first load stress.
t0-t1 indicates the first preset time interval.
t1-t2 indicates the second preset time interval.
t2-t3 indicates the unloading time.
t3-t4 indicates the first preset time interval.
t4-t5 indicates the second preset time interval.
t5-t6 indicates the unloading time.

Referring to FIG. 2, a contrast test process includes the following specific steps. A second load stress lower than the rated load stress is set; the contrast test is performed by loading the second load stress to second speed reducer samples until the test is finished.

A service life in the contrast test is calculated.

An acceleration coefficient is calculated, and the acceleration coefficient is equal to a ratio of the service life in the accelerated life test to the service life in the contrast test.

By setting the accelerated life test as shown in FIG. 4 as a third accelerated life test, the calculated acceleration coefficient is a third acceleration coefficient which is equal to a ratio of the service life in the third accelerated life test to the service life in the contrast test.

After the third acceleration coefficient is obtained, if the service lives of the speed reducer are to be obtained, each speed reducer can be tested according to the process of the third accelerated life test. The service life in the third accelerated life test is firstly obtained, and the service life of the speed reducer can be obtained. The service life of the speed reducer is equal to a ratio of the service life in the third accelerated life test to the third acceleration coefficient.

Embodiment IV

Figure 5:
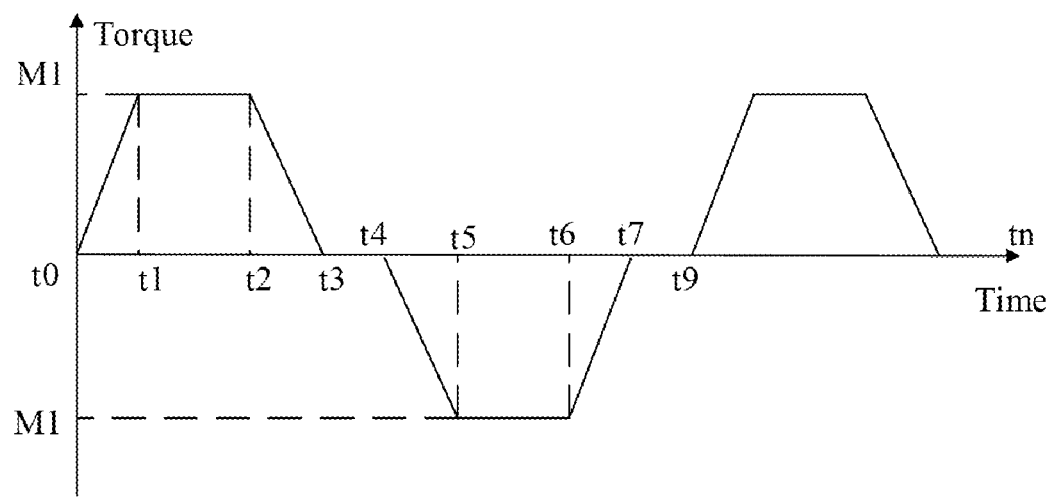
FIG. 5 is a schematic diagram of a process of a fourth accelerated life test according to an embodiment of the present disclosure.

The difference of this embodiment from embodiment III is that the accelerated life test further includes the following steps. The first load stress is unloaded after the first speed reducer sample operates for a second preset time interval at a first load stress; and after the first load stress is unloaded for a third preset time interval, the first speed reducer sample is switched to operate in a first direction or a second direction. Referring to FIG. 5, the difference from FIG. 4 is that the first load stress of the speed reducer is unloaded after the speed reducer operates for the second preset time interval at the first load stress; the speed reducer is stopped for the third preset time interval, and then the operating direction of the speed reducer is switched. Namely, the torque value represented by M1 in FIG. 5 is the first load stress.
t0-t1 indicates the first preset time interval.
t1-t2 indicates the second preset time interval.
t2-t3 indicates the unloading time.

t3-t4 indicates the third preset time interval.
t4-t5 indicates the first preset time interval.
t4-t6 indicates the second preset time interval.
t6-t7 indicates the unloading time.
t7-t9 indicates the third preset time interval.

The contrast test includes the following steps. Referring to FIG. 2, the contrast test process includes the following specific steps. A second load stress lower than the rated load stress is set. A contrast test is performed by loading the second load stress until the test is finished until the test is finished.

A service life in the contrast test is calculated.

An acceleration coefficient is calculated, and the acceleration coefficient is equal to a ratio of the service life in the accelerated life test to the service life in the contrast test.

By setting the accelerated life test as shown in FIG. 5 as a fourth accelerated life test, the calculated acceleration coefficient is a fourth acceleration coefficient which is equal to a ratio of the service life in the fourth accelerated life test to the service life in the contrast test.

After the fourth acceleration coefficient is obtained, if the service lives of the speed reducer are to be obtained, each speed reducer can be tested according to the process of the fourth accelerated life test. The service life in the fourth accelerated life test is firstly obtained, and the service life of the speed reducer can be obtained. The service life of the speed reducer is equal to a ratio of the service life in the fourth accelerated life test to the fourth acceleration coefficient.

Embodiment V

Figure 6:
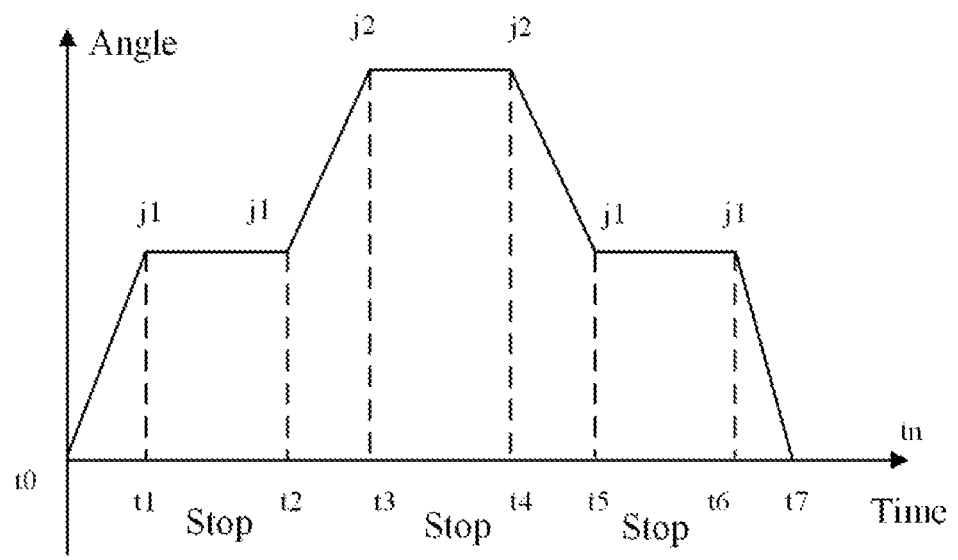
FIG. 6 is a schematic diagram of a process of a fifth accelerated life test according to an embodiment of the present disclosure.

An accelerated life test method for a speed reducer of an industrial robot includes the following steps. Referring to FIG. 6, in the embodiment, the accelerated life test includes the following specific steps. A first load stress higher than the rated load stress is set; an accelerated life test is performed by loading the first load stress to first speed reducer samples, the output end of the first speed reducer samples is driven to rotate to a first preset angle in a fourth preset time interval; the first speed reducer sample is remained at the first preset angle for a fifth preset time interval; the output end of the first speed reducer sample is driven to rotate to a second preset angle in the fourth preset time interval; the first speed reducer sample is remained at the second preset angle for a fifth preset time interval; the output end of the first speed reducer sample is driven to rotate back to the first preset angle in a fourth preset time interval; the first speed reducer sample is remained at the first preset angle for the fifth preset time interval; and the output end of the first speed reducer sample is driven to rotate to an initial position. A service life of the accelerated life test is calculated.

In FIG. 6, under the first load stress, in the t0-t1 time interval, namely in the fourth preset time interval, the output end of the speed reducer is moved with acceleration, and the speed reducer is rotated to the first preset angle. namely j1. The speed reducer is moved with acceleration in the t0-t1 time interval.

The speed reducer is remained at the first preset angle, namely j1, for the fifth preset time interval, namely t1-t2.

In the t2-t3 time interval, namely in the fourth preset time interval, the speed reducer continuous to move with acceleration to rotate to the second preset angle, namely j2.

The speed reducer is remained at the second preset angle, namely j2, for the fifth preset time interval, namely t3-t4.

In the t4-t5 time interval, namely in the fourth preset time interval, the speed reducer is moved with deceleration to rotate to the first preset angle, namely j1.

The speed reducer is remained at the first preset angle, namely j1, for the fifth preset time interval, namely t5-t6.

In the t6-t7 time interval, namely in the fourth preset time interval, the speed reducer continuous to move with deceleration to return to the initial position.

Referring to FIG. 2, in the embodiment, the contrast test includes the following specific steps. A second load stress lower than the rated load stress is set. A contrast test is performed by loading the second load stress to second speed reducer samples until the test is finished.

A service life in the contrast test is calculated.

An acceleration coefficient is calculated, and the acceleration coefficient is equal to a ratio of the service life in the accelerated life test to the service life in the contrast test.

By setting the accelerated life test as shown in FIG. 6 as a fifth accelerated life test, the calculated acceleration coefficient is a fifth acceleration coefficient which is equal to a ratio of the service life in the fifth accelerated life test to the service life in the contrast test.

After the fifth acceleration coefficient is obtained, if the service lives of the speed reducer are to be obtained, each speed reducer can be tested according to the process of the fifth accelerated life test. The service life in the fifth accelerated life test is firstly obtained, and the service life of the speed reducer can be obtained. The service life of the speed reducer is equal to a ratio of the service life in the fifth accelerated life test to the fifth acceleration coefficient.

Embodiment VI

An accelerated life test method for a speed reducer of an industrial robot includes the following steps. A first load stress higher than rated load stress and a second load stress lower than the rated load stress are set; an accelerated life test is performed by loading the first load stress to first speed reducer samples, and a temperature stress of each of the first speed reducer samples is set, where a working temperature of the first speed reducer sample under the temperature stress is higher than a rated working temperature of the first speed reducer sample; and the temperature stress is used as the accelerated stress in the accelerated life test; a service life in the accelerated life test is calculated; a contrast test is performed by loading the second load stress to second speed reducer samples; a service life of the contrast test is calculated; and an acceleration coefficient is calculated which is equal to a ratio of the service life in the accelerated life test to the service life in the contrast test.

Figure 7:
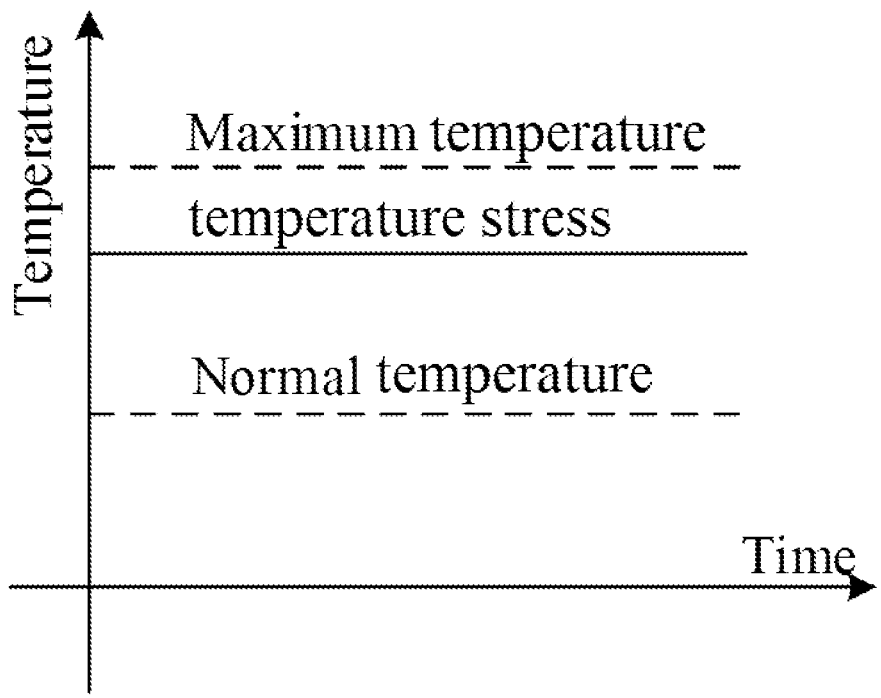
FIG. 7 is a schematic diagram of a process of a sixth accelerated life test according to an embodiment to the present disclosure.

Referring to FIG. 7, in the embodiment, the accelerated life test includes the following specific steps. The first load stress higher than the rated load stress is set. The accelerated life test is performed by loading the first load stress to first speed reducer samples, and a temperature stress of each of the first speed reducer samples is set, where a working temperature of the first speed reducer sample under the temperature stress is higher than a rated working temperature of the first speed reducer sample; and the temperature stress is used as the accelerated stress in the accelerated life test; the service life in the accelerated life test is calculated.

The rated working temperature of the industrial robot is set to be 5° C. to 55° C.

In FIG. 7, a normal temperature refers to any temperature value in the rated working temperature interval, such as 40° C.

The temperature that the speed reducer can withstand in the working process is much higher than the working temperature of the industrial robot. For example, the rated working temperature of lubricating grease of an RV speed reducer is −40° C. to 130° C., and the rated working temperature of lubricating grease for a harmonic speed reducer is −10° C. to 70° C.

The maximum temperature that the speed reducer can withstand is selected without changing the failure mechanism of the speed reducer. Namely, without changing the lubricating grease lubrication state of the speed reducer, the temperature stress of the RV speed reducer may be 130° C., and the temperature stress of the harmonic speed reducer may be 70° C.

Referring to FIG. 2, in the embodiment, the contrast test includes the following specific steps. The second load stress lower than the rated load stress is set. The contrast test is performed by loading the second load stress to second speed reducer samples until the test is finished.

The service life in the contrast test is calculated.

The rated working temperature of the industrial robot is set to be 5° C. to 55° C.

The temperature that the speed reducer can withstand in the working process is much higher than the working temperature of the industrial robot. For example, the rated working temperature of the lubricating grease of the RV speed reducer is −40° C. to 130° C., and the rated working temperature of the lubricating grease for the harmonic speed reducer is −10° C. to 70° C.

In the contrast test, the temperature stress of the selected RV speed reducer may be 100° C., and the temperature stress of the harmonic speed reducer may be 50° C.

The acceleration coefficient is equal to a ratio of the service life in the accelerated life test to the service life in the contrast test.

By setting the accelerated life test as shown in FIG. 7 as a sixth accelerated life test, the calculated acceleration coefficient is a sixth acceleration coefficient which is equal to a ratio of the service life in the sixth accelerated life test to the service life in the contrast test.

After the sixth acceleration coefficient is obtained, if the service lives of the speed reducer are to be obtained, each speed reducer can be tested according to the process of the sixth accelerated life test. The service life in the sixth accelerated life test is firstly obtained, and the service life of the speed reducer can be obtained. The service life of the speed reducer is equal to a ratio of the service life in the sixth accelerated life test to the sixth acceleration coefficient.

Embodiment VII

An accelerated life test method for a speed reducer of an industrial robot includes the following steps. A first load stress higher than rated load stress and a second load stress lower than the rated load stress are set. An accelerated life test is performed by loading the first load stress to the first speed reducer samples, and the working temperature of each of the first speed reducer samples under the temperature stress is set to include a first temperature, a second temperature and a third temperature which are gradually increased; and, the working temperature of the first speed reducer sample is gradually increased to the first temperature T1, to the second temperature T2 and to the third temperature T3 in a sixth-time-interval-spaced manner. Namely in the 0-t1 time interval, the accelerated life test is performed by loading the first load stress, the first temperature T1 is set, and the speed reducer is operated for the sixth preset time interval. In the t1-t2 time interval, the accelerated life test is performed by loading the first load stress, the second temperature T2 is set, the speed reducer is operated for the sixth preset time interval. And, in the t2-t3 time interval, the accelerated life test is performed by loading the first load stress, the third temperature T3 is set, and the speed reducer is operated for the sixth preset time interval.

A service life in the accelerated life test is calculated. A contrast test is performed by loading the second load stress. A service life in the contrast test is calculated. An acceleration coefficient is calculated, and the acceleration coefficient is equal to a ratio of the service life in the accelerated life test to the service life in the contrast test.

Figure 8:
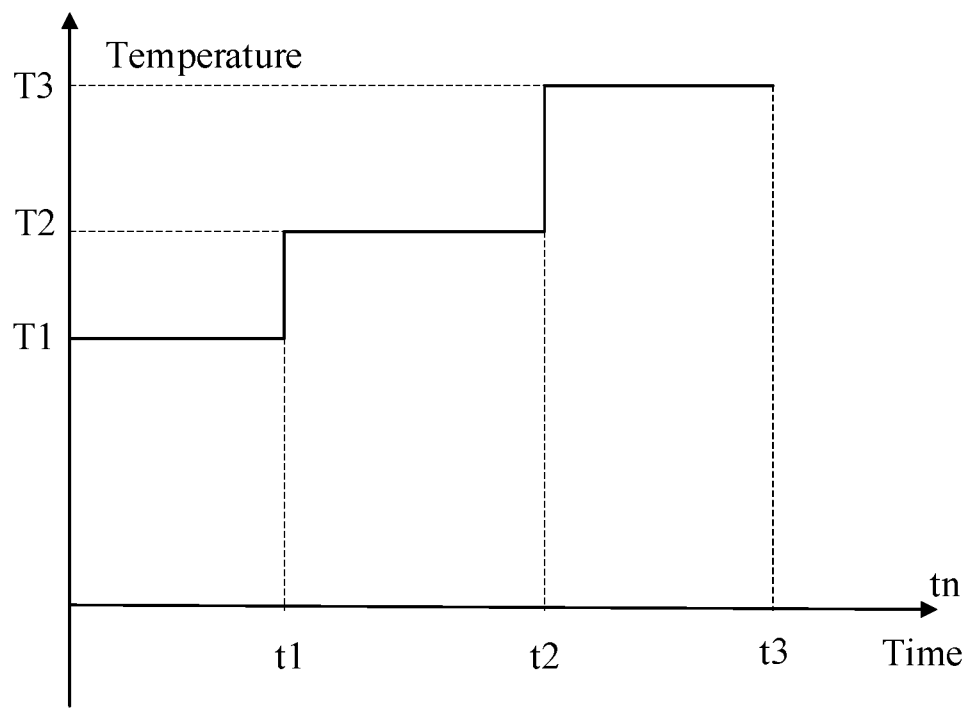
FIG. 8 is a schematic diagram of a process of a seventh accelerated life test according to an embodiment of the present disclosure.

Referring to FIG. 8, in the embodiment, the accelerated life test includes the following specific steps. The first load stress higher than the rated load stress is set. The accelerated life test is performed by loading the first load stress to the first speed reducer samples, the working temperature of each of the first speed reducer samples under the temperature stress is set to include the first temperature, the second temperature and the third temperature which are gradually increased; the working temperature of the first speed reducer sample is gradually increased to the first temperature, to the second temperature and to the third temperature in a sixth-time-interval-spaced manner; and the service life of the accelerated life test is calculated.

As the working time of the industrial robot is increased, the temperature of the speed reducer is gradually increased and tends to be stable. In order to better reflect temperature changes in the working process of the industrial robot and simultaneously reduce the test time, three temperatures with different stress levels are set to carry out the accelerated life test at gradually increased temperature stresses. The maximum stress level is not higher than the maximum temperature that the speed reducer can withstand, so that a good acceleration effect can be achieved, and the actual working conditions of the industrial robot can also be simulated.

As shown in FIG. 8, the three high-temperature stress levels including the first temperature T1, the second temperature T2 and the third temperature T3 are set, so as to carry out a temperature step stress test, so that the life test of the speed reducer is accelerated. Preferably, with the lubricating grease of the RV speed reducer, the temperature T1 is 110° C., the second temperature T2 is 120° C., and the third temperature T3 is 130° C.

Referring to FIG. 2, in the embodiment, the contrast test includes the following specific steps. The second load stress lower than the rated load stress is set. The contrast test is performed by loading the second load stress to second speed reducer samples until the test is finished. The service life in the contrast test is calculated. The acceleration coefficient is calculated which is equal to a ratio of the service life in the accelerated life test to the service life in the contrast test.

By setting the accelerated life test as shown in FIG. 8 as a seventh accelerated life test, the calculated acceleration coefficient is a seventh acceleration coefficient which is equal to a ratio of the service life in the seventh accelerated life test to the service life in the contrast test.

After the seventh acceleration coefficient is obtained, if the service lives of the speed reducer are to be obtained, each speed reducer can be tested according to the process of the seventh accelerated life test. The service life in the seventh accelerated life test is seventhly obtained, and the service life of the speed reducer can be obtained. The service life of the speed reducer is equal to a ratio of the service life in the seventh accelerated life test to the seventh acceleration coefficient. In any embodiment, the accelerated life test and the contrast test further include the following steps, performance indexes of each of the first speed reducer samples and the second speed reducer samples are tested after every preset time interval; and the accelerated life test and the contrast test are stopped in response to the first speed reducer samples and second speed reducer samples being failure.

The above description is merely illustrative of preferred embodiments of the present disclosure and of the principles of the employed technology. It should be understood by those skilled in the art that the scope referred to in the present disclosure is not limited to technical solutions formed by specific combinations of the above technical features, but also covers other technical solutions formed by any combination of the above technical features or equivalents thereof without departing from the concept of the present disclosure. For example, the technical solutions formed by replacing the above features and the technical features disclosed (but not limited to) in the present disclosure with similar functions with each other.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An accelerated life test method for a speed reducer of an industrial robot, comprising:
   setting a first load stress higher than a rated load stress, and a second load stress lower than the rated load stress;
   performing an accelerated life test by loading the first load stress to first speed reducer samples;
   calculating a service life of each of the first speed samples in the accelerated life test;
   performing a contrast test by loading the second load stress to second speed reducer samples;
   calculating a service life of each of the second speed samples in the contrast test;
   calculating an acceleration coefficient, wherein the acceleration coefficient is equal to a ratio of the service life in the accelerated life test to the service life in the contrast test;
   estimating a lifetime of the speed reducer according to the acceleration coefficient;
   and servicing or replacing the speed reducer before it has reached its estimated lifetime.

2. The accelerated life test method for a speed reducer of an industrial robot according to claim 1, wherein the accelerated life test method further comprises:
   switching the first speed reducer samples to operate in a first direction for a preset time interval and then unloading the first load stress; and
   switching the first speed reducer samples to operate in a second direction for a preset time interval and then unloading the first load stress.

3. The accelerated life test method for a speed reducer of an industrial robot according to claim 2, wherein the accelerated life test method further comprises:
   switching the first speed reducer samples to operate in the first direction for a first preset time interval and then loading a stress of each of the first speed reducer samples to the first load stress or the second load stress;
   enabling the first speed reducer samples to operate for a second preset time interval at the first load stress or the second load stress and then unloading the first load stress or the second load stress;
   switching the first speed reducer samples to operate in the second direction for the first preset time interval and then loading the stress of each of the first speed reducer samples to the first load stress or the second load stress;
   enabling the first speed reducer samples to operate for the second preset time interval at the first load stress or the second load stress and then unloading the first load stress or the second load stress.

4. The accelerated life test method for a speed reducer of an industrial robot according to claim 3, wherein the accelerated life test method further comprises:
   enabling the first speed reducer samples to operate for the second preset time interval at the first load stress or the second load stress and then unloading the first load stress or the second load stress; and
   after unloading the first load stress or the second load stress for a third preset time interval, switching the first speed reducer samples to operate in the first direction or the second direction.

5. The accelerated life test method for a speed reducer of an industrial robot according to claim 1, wherein the accelerated life test method further comprises:
   for each of the first speed reducer samples,
   driving an output end of the first speed reducer sample to rotate to a first preset angle in a fourth preset time interval, and enabling the first speed reducer sample to remain at the first preset angle for a fifth preset time interval;
   driving the output end of the first speed reducer sample to rotate to a second preset angle in the fourth preset time interval, and enabling the first speed reducer sample to remain at the second preset angle for the fifth preset time interval;
   driving the output end of the first speed reducer sample to rotate back to the first preset angle in the fourth preset time interval, and enabling the first speed reducer sample to remain at the first preset angle for the fifth preset time interval; and
   driving the output end of the first speed reducer sample to rotate to an initial position.

6. The accelerated life test method for a speed reducer of an industrial robot according to claim 1, wherein the accelerated life test method further comprises:
   setting a temperature stress of each of the first speed reducer samples, wherein a working temperature of the first speed reducer sample under the temperature stress is higher than a rated working temperature of the first speed reducer sample; and
   using the temperature stress as an accelerated stress in the accelerated life test.

7. The accelerated life test method for a speed reducer of an industrial robot according to claim 6, wherein the accelerated life test method further comprises:
   setting the working temperature of each of the first speed reducer samples under the temperature stress to comprise a first temperature, a second temperature and a third temperature which are gradually increased; and
   gradually increasing the working temperature of the first speed reducer sample to the first temperature, to the second temperature and to the third temperature in a sixth-time-interval-spaced manner.

8. The accelerated life test method for a speed reducer of an industrial robot according to claim 1, comprising:
   the accelerated life test and the contrast test further comprise:
   testing performance indexes of each of the first speed reducer samples and the second speed reducer samples in a preset-time-spaced manner; and
   stopping the accelerated life test and the contrast test in response to the first speed reducer samples and second speed reducer samples being failure.

9. The accelerated life test method for a speed reducer of an industrial robot according to claim 2, comprising:
   the accelerated life test and the contrast test further comprise:
   testing performance indexes of each of the first speed reducer samples and the second speed reducer samples in a preset-time-spaced manner; and
   stopping the accelerated life test and the contrast test in response to the first speed reducer samples and second speed reducer samples being failure.

10. The accelerated life test method for a speed reducer of an industrial robot according to claim 3, comprising:
    the accelerated life test and the contrast test further comprise:
    testing performance indexes of each of the first speed reducer samples and the second speed reducer samples in a preset-time-spaced manner; and
    stopping the accelerated life test and the contrast test in response to the first speed reducer samples and second speed reducer samples being failure.

11. The accelerated life test method for a speed reducer of an industrial robot according to claim 4, comprising:
    the accelerated life test and the contrast test further comprise:
    testing performance indexes of each of the first speed reducer samples and the second speed reducer samples in a preset-time-spaced manner; and
    stopping the accelerated life test and the contrast test in response to the first speed reducer samples and second speed reducer samples being failure.

12. The accelerated life test method for a speed reducer of an industrial robot according to claim 5, comprising:
    the accelerated life test and the contrast test further comprise:
    testing performance indexes of each of the first speed reducer samples and the second speed reducer samples in a preset-time-spaced manner; and
    stopping the accelerated life test and the contrast test in response to the first speed reducer samples and second speed reducer samples being failure.

13. The accelerated life test method for a speed reducer of an industrial robot according to claim 6, comprising:
    the accelerated life test and the contrast test further comprise:
    testing performance indexes of each of the first speed reducer samples and the second speed reducer samples in a preset-time-spaced manner; and
    stopping the accelerated life test and the contrast test in response to the first speed reducer samples and second speed reducer samples being failure.

14. The accelerated life test method for a speed reducer of an industrial robot according to claim 7, comprising:
    the accelerated life test and the contrast test further comprise:
    testing performance indexes of each of the first speed reducer samples and the second speed reducer samples in a preset-time-spaced manner, and
    stopping the accelerated life test and the contrast test in response to the first speed reducer samples and second speed reducer samples being failure.

* * * * *